April 29, 1969 S. J. GUSTETIC 3,441,099
WEIGHING APPARATUS FOR A CANTILEVER LOAD
Filed July 28, 1966 Sheet 3 of 5

INVENTOR
STANLEY J. GUSTETIC
BY
*Baldwin, Doan & Egan*
ATTORNEYS

INVENTOR
STANLEY J. GUSTETIC
BY
*Baldwin, Doran & Egan*
ATTORNEYS

April 29, 1969 S. J. GUSTETIC 3,441,099
WEIGHING APPARATUS FOR A CANTILEVER LOAD
Filed July 28, 1966 Sheet 5 of 5

INVENTOR
STANLEY J. GUSTETIC
BY
Baldwin, Dorant Egan
ATTORNEYS

United States Patent Office 3,441,099
Patented Apr. 29, 1969

3,441,099
WEIGHING APPARATUS FOR A CANTILEVER LOAD
Stanley J. Gustetic, Euclid, Ohio, assignor to The Euclid Crane and Hoist Company, Cleveland, Ohio
Filed July 28, 1966, Ser. No. 568,444
Int. Cl. G01g 23/02
U.S. Cl. 177—151                              12 Claims

ABSTRACT OF THE DISCLOSURE

A load transfer and storage mechanism including a movable load carrier for inserting loads into and withdrawing loads from a storage means disposed along a path of travel of the load carrier and with the load carrier including a load supporting means thereon of cantilever-like construction with an eccentric mounting arrangement for supporting the load supporting means on the load carrier, and with a weighing mechanism operatively coupled to the load supporting means for determining the weight of a load on the load supporting means. The weighing mechanism illustrated comprises an electronic load cell system.

---

This invention relates in general to an automatic warehousing system for storing articles, and more particularly relates to a movable load carrier mechanism and an associated weighing apparatus, for weighing a load supported on the load carrier mechanism.

In the copending U.S. patent application Ser. No. 329,415, filed Dec. 10, 1963 in the name of Stewart F. Armington et al. and entitled Stacker Crane, now Patent 3,268,097 issued Aug. 23, 1966 there is disclosed an automatic warehousing system including a load carrier in the form of a stacker crane of the general type with which the instant invention may be used. Such load carrier or stacker crane of the aforesaid pending application is supported on a pair of rails disposed parallel with a travel zone or aisle, which in turn is adjacent to a storage frame having generally horizontally projecting load supporting arms, with the load carrier being adapted to travel both horizontally and vertically in the aisle and to deposit and retrieve loads or articles from the storage frame. The load carrier includes an extractor mechanism comprisng a laterally movable carriage and a cantilever-like load supporting means in the form of an extractor fork attached to the carriage, for supporting the load and moving the load onto or from the load supporting arms of the storage frame.

The present invention provides a load carrier having a weighing mechanism operatively coupled to the load supporting means of the extractor thereof, for effectively weighing a load supported on the extractor. This enables the operator of the load carrier to readily determine the weight of the load being either deposited or removed from the storage frame. The weighing mechanism in the embodiment illustrated utilizes an electronic load cell system for determining with very high accuracy the weight of the load supported by the extractor mechanism.

Accordingly, an object of the invention is to provide a novel load handling apparatus which includes a load weighing mechanism.

Another object of the invention is to provide a novel load handling and coacting weighing mechanism wherein the extractor device for supporting the load comprises a cantilevered arrangement and wherein eccentric bearing means mount the load supporting means of the extractor device on the load carrier such that the weight of the load on the load supporting means acts substantially vertically on the weighing mechanism, for accurate actuating of the weighing mechanism.

Another object of the invention is to provide a load carrier and associated weighing mechanism of the above general type wherein the weighing mechanism is extremely compact and comprises an electronic system including at least one electronic load cell, providing for accurate measurement of the weight being carried by the load supporting means of the load carrier.

A still further object of the invention is to provide a load handling and storage mechanism of the above discussed type wherein the eccentric coupling between the load supporting means of the extractor device and the associated extractor carriage involves two pair of eccentric mechanisms, with the eccentrics of each pair being aligned substantially vertically with respect to one another, and so arranged that the vertical component of the weight on the load supporting means of the extractor device due to the weight of the load is directed generally vertically downwardly, for proper application of the weight force to the electronic load cell of the weighing system, for accurate measurement of the weight force.

A still further object of the invention is to provide a novel load handling and storage mechanism including an extractor wherein the extractor comprises a forklike mechanism which is suspended on a laterally movable carriage by means of a four point eccentric suspension, and with the fork being operatively coupled to a compact weighing mechanism which includes electronic load cell means which in turn is coupled to a visual read out mechanism for enabling the operator to readily and accurately determine the weight of the load supported on the fork.

Other objects and advantages of the invention will be apparent from the following description taken in conjunction with the accompanying drawings wherein.

Figure 1:
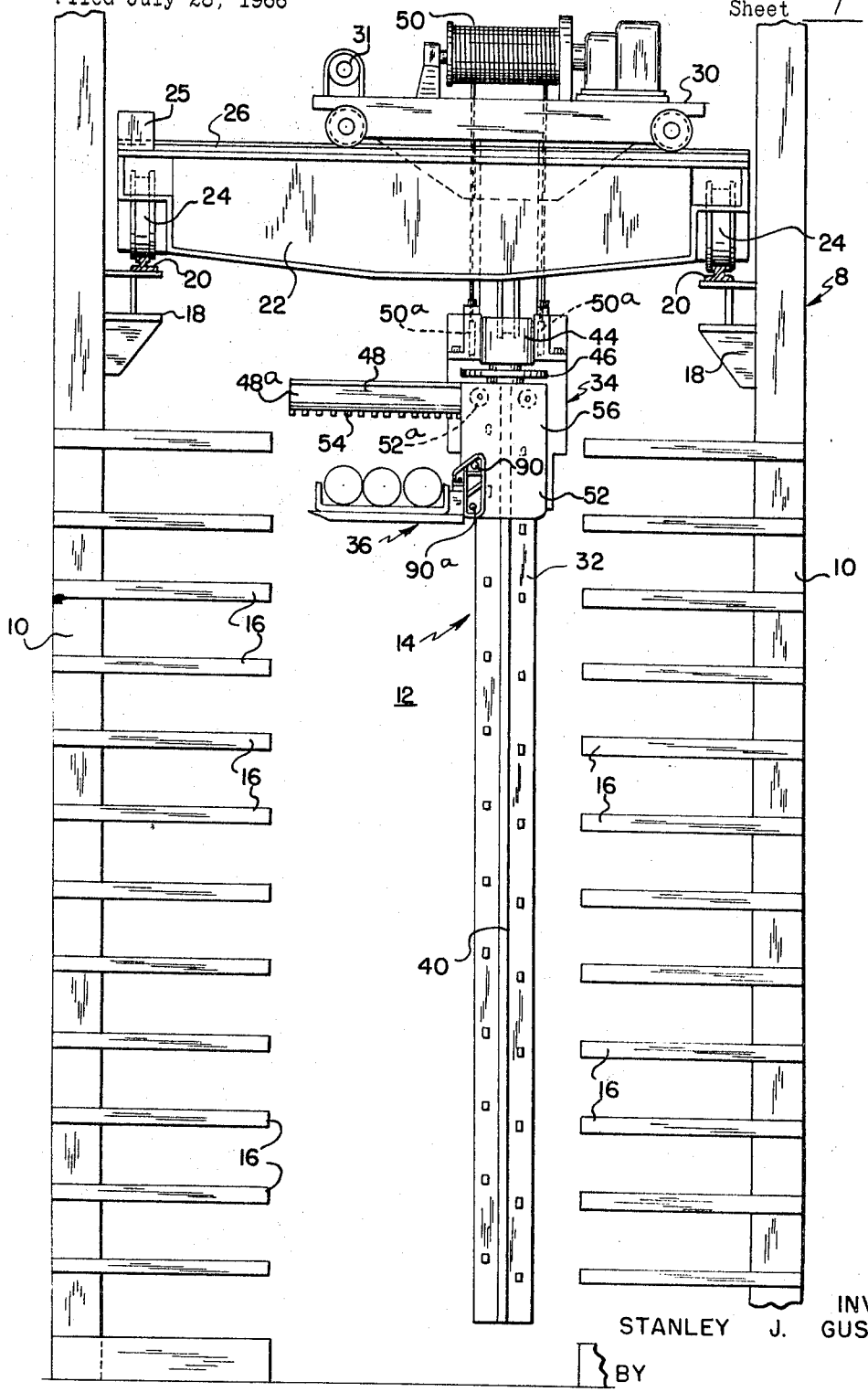
FIGURE 1 is a generally diagrammatic end elevational view of a load handling and storage mechanism embodying the instant invention.

Referring now again to the drawings, the warehousing system herein illustarted may comprise a storage frame 8 formed or parallel rows of vertical posts 10 defining between them an aisle or travel zone 12 in which is adapted to travel a load carrier 14, and deposit a load into or pick-up a load from the storage frame. The posts 10 are adapted to support a plurality of vertically spaced load supports 16 which in the embodiment illustrated comprise cantilevered arms extending generally horizontally away from the posts and toward the aisle, for supporting a load thereon.

In the embodiment illustrated, the posts 10 are provided wtih supports 18 mounting rails 20 thereon, which rails extend parallel to the aisle above the load supports 16. The aforementioned load carrier 14 may include a mobile bridge 22 extending across the aisle and being supported for movement lengthwise of the aisle, as by means of the wheels 24 coacting in rolling engagement with the rails 20. Bridge 22 may be actuated for movement on rails 20 by any suitable means, such as for instance electric motor 25 suitably coupled to wheels 24. Mounted on the bridge 22 are rails 26 extending transversely of the bridge, and which may support a trolley 30 which in turn supports a depending mast 32 extending downwardly into the aisle. Trolley 30 may be actuated on rails 26 by any suitable means, such as for instance an electric motor 31 suitably coupled to the trolley wheels. Transverse movement of the trolley with respect to the bridge moves the mast with the trolley transversely of the aisle.

Mounted on the mast 32 for vertical movement with respect thereto is a hoist carriage 34 with the hoist carriage supporting an extractor mechanism 36 thereon. The hoist carriage may include a suitable sleeve-like member 38 which may have a central vertical opening therethrough receiving the mast and associated replaceable guide bars 40 on opposite sides of the mast. The hoist carriage may support a cab 42 thereon for disposal on one side of the mast, and in which cab an operator may ride. Suitable controls may be located in the cab for actuating and controlling the crane.

On the other side of the mast, the hoist carriage may support a turret bearing member 44 rotatably mounted a turret member 46 which supports the extractor means 36, thereby providing for movement of the extractor either to the right or to the left-hand side of the mast, and thus providing for insertion or retraction of loads on both sides of the storage frame. Suitable power mean such as for instance a reversible electric motor may be disposed in the turret-bearing member 44 and utilized to rotate the turret.

Secured to the turret 46 for rotation therewith may be a cantilevered-like support frame work 48 which mounts two spaced parallel tracks 48a which in turn may support the movable extractor mechanism 36. Any suitable means may be provided for moving the hoist carriage vertically of the mast 32 and as for instance winch mechanism 50 mounted on trolley 30 and suitably coupled to the hoist carriage as at 50a.

The extractor 36 may comprise a carriage 52 having wheels 52a rotatably mounted on the inner sides thereof and disposed in rolling coaction with the tracks 48a on the cantilevered support, for supporting the extractor for horizontal movement on the tracks. Suitable power means such as a reversible electric motor (not shown) may be provided for driving the extractor carriage 52 horizontally on the tracks, and in the embodiment illustrated such motor is adapted to actuate a gear means which is drivingly engaged with a rack 54 mounted on the bottom of each of the pair of tracks 48a for causing horizontal movement of the extractor carriage.

The extractor carriage 52 may be of fabricated construction comprising sidewalls 56 and a front wall 56a, which may be recessed adjacent the bottom portions thereof as at 56b. Walls 56, 56a may be connected by other walls and strengthening struts (e.g. 58, 58a) to form a generally rigid structure. Strut 60 may also be provided, extending between the sidewalls 56 and attached to the latter and to the front wall, for a purpose to be hereinafter set forth. The extractor carriage 52 is adapted to support the load carrying means which in the embodiment illustrated comprises an extractor fork member 62 disposed in cantilever fashion on the extractor carriage.

Fork member 62 may comprise an elongated backup beam 64 preferably of hollow construction having load supporting tines 66, 66a, extending generally horizontally outwardly therefrom, and with such tines being preferably movably coupled to the backup beam member for pivoting in a generally horizontal plane. The extractor fork may be of the general type illustrated and described in the copending U.S. patent application of George E. Armington et al., Ser. No. 566,290, filed July 19, 1966 and entitled Load Transfer and Storage Mechanism, and reference may be had thereto for a detailed description of such an extractor fork construction.

Figure 5:
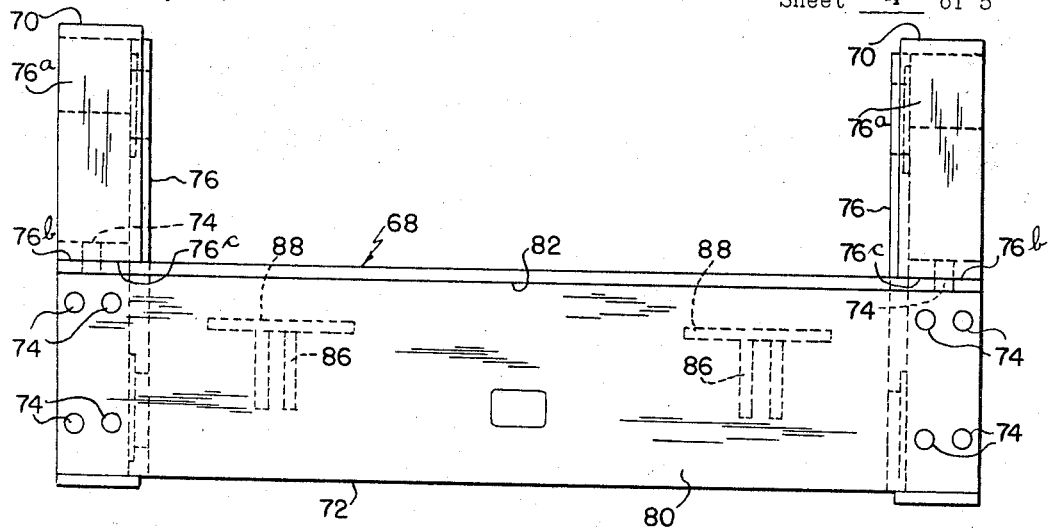
FIGURE 5 is an enlarged front elevational view of a carrier frame used to couple the extractor fork to the weighing mechanism and to the extractor carriage.
Figure 6:
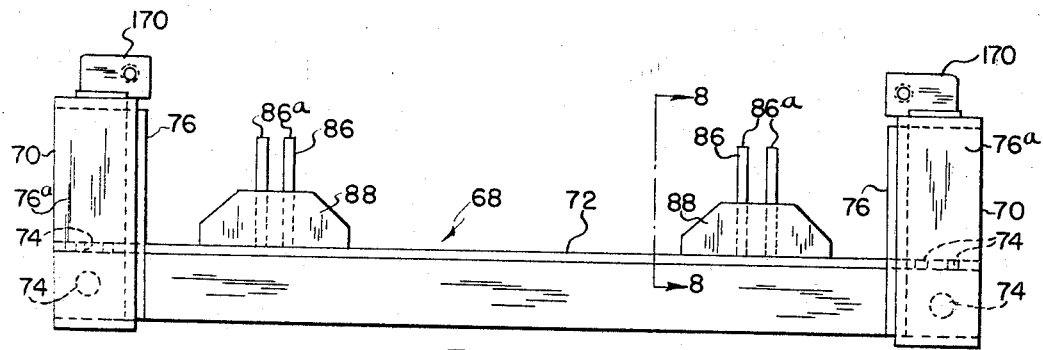
FIGURE 6 is a top plan view of the FIGURE 5 illustration.
Figure 7:
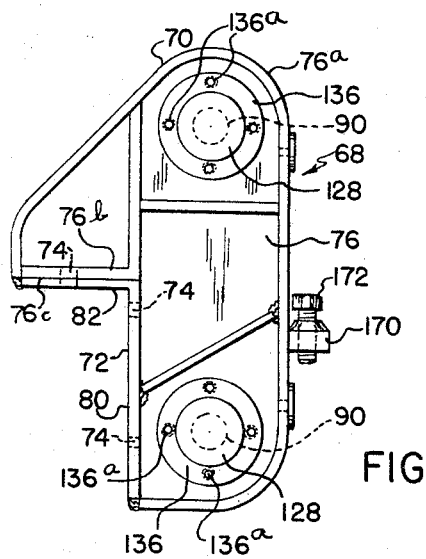
FIGURE 7 is a side elevational view of the FIGURES 5 and 6 fork carrier.
Figure 8:
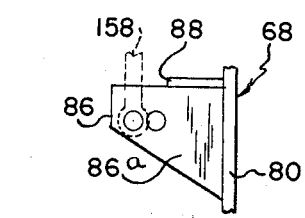
FIGURE 8 is a side elevational view taken generally along the plane of line 8—8 of FIGURE 6, looking in the direction of the arrows.

In the embodiment illustrated, the extractor fork 62 is adapted to be coupled to and supported on the extractor carriage by means of a fork carrier structure 68 which as can be best seen in FIGURES 5, 6 and 7 may comprise a pair of spaced, end, hanger bracket portions 70 adapted for movable coupling to the extractor carriage 52, and a connecting bridging portion 72 having means 74 thereon adapted for receiving fastener means, such as bolt and nut assemblies, for securing the fork carrier 68 to the backup beam 64 of the extractor fork 62.

Figure 2:
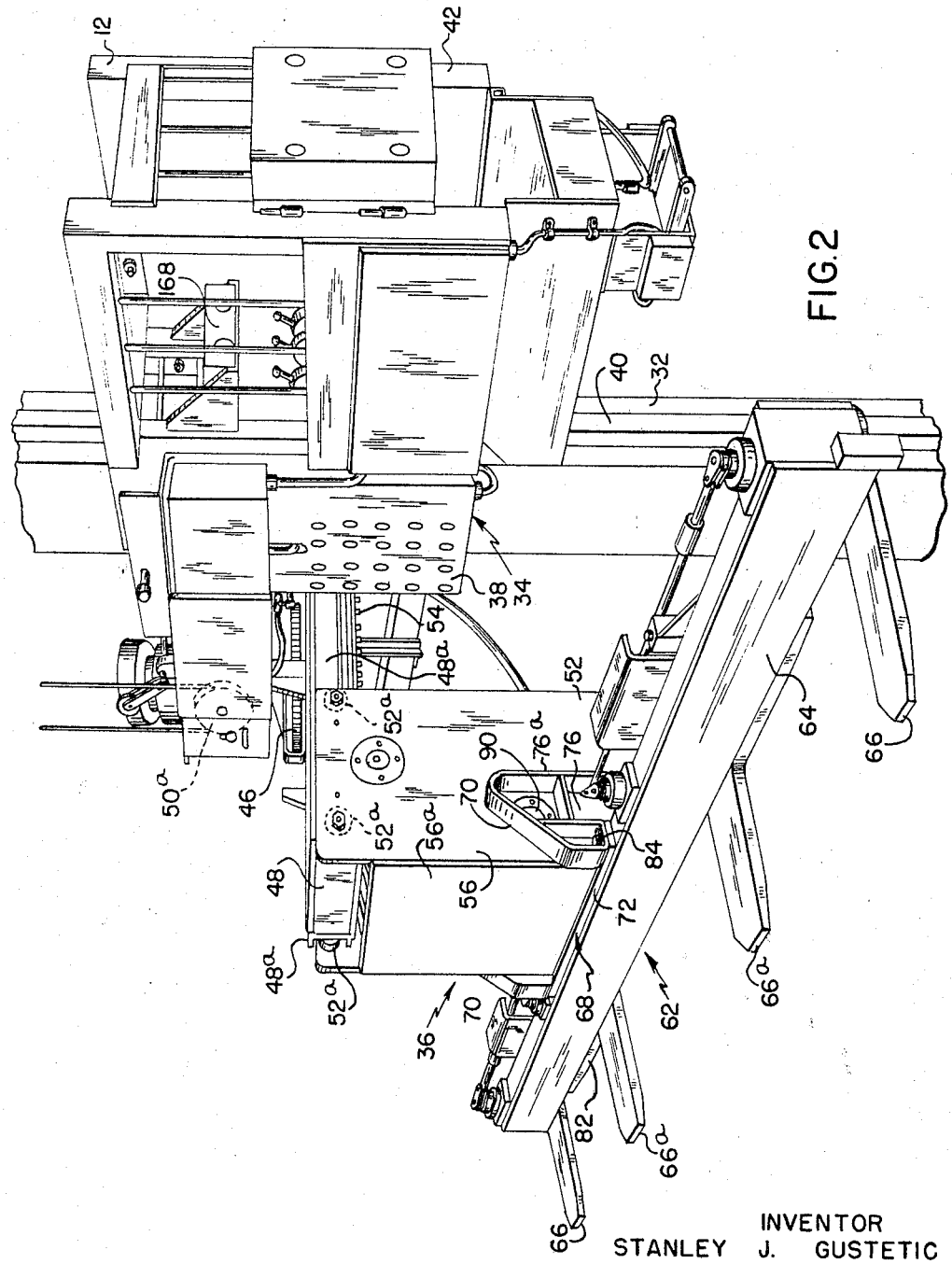
FIGURE 2 is an enlarged, perspective, fragmentary view of the vertically movable hoist carriage of the load handling mechanism, and showing the connection of the extractor fork to the extractor carriage.
Figure 3:
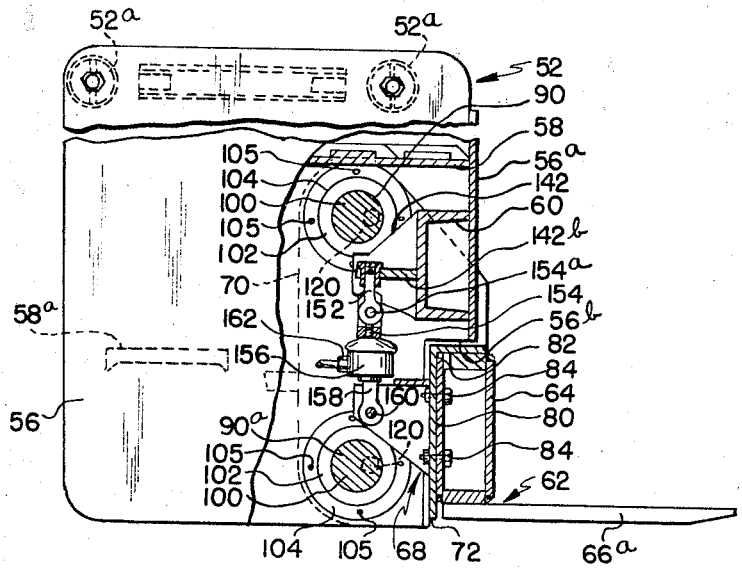
FIGURE 3 is a partially broken side elevational view of the extractor mechanism illustrated in FIGURE 2, and illustrating one of the load cells of the weighing mechanism associated with the extractor mechanism, for weighing a load supported on the extractor mechanism.

As can be best seen in FIGURES 5 and 6, each of the hanger bracket portions 70 may comprise a generally vertical side wall 76 with a peripheral outwardly extending flange 76a extending partially therearound and attached thereto, for strengthening the respective bracket portion. Each bracket portion may include a section 76b which extends forwardly and which provides a substantially flat undersurface 76c adapted for secured abutting engagement with the inverted L-shaped bridging portion 72 of the fork carrier. Bridging portion 72 may be attached to the bracket portions 70 by means of welding to form integral carrier structure 68. The bridging portion 72 provides a substantially vertical flat surface 80 and a substantially flat horizontal surface 82 which are adapted for abutting relation with respectively the rear side and the top surface of the backup beam 64 of the extractor fork, when the fork is coupled to the carrier 68 as by means of the bolt and nut assemblies 84 (FIGURES 2 and 3).

Extending rearwardly from the bridging portion 72 of carrier 68 there may be provided force applying arms 86 which in the embodiment illustrated comprise laterally spaced pairs of vertically extending flanges 86a connected at their upper ends by means of a transversely extending strengthening web 88. The force arms are adapted to apply the downward force due to the weight of a load supported on the extractor 36, to the weighing system, as will be hereinafter described.

The fork carrier 68 and associated fork 62 are movably coupled to the extractor carriage 52 by the spaced hanger bracket portions 70. In this connection, such coupling comprises a pair of generally vertically arranged eccentrics 90, 90a, mounted on each of the sidewalls 56 of the extractor carriage 52 and coacting in supporting relation with the sidewall 76 of the respective hanger bracket portion 70. Since all of the eccentric couplings 90, 90a are of identical construction only one will be described in detail.

Figure 9:
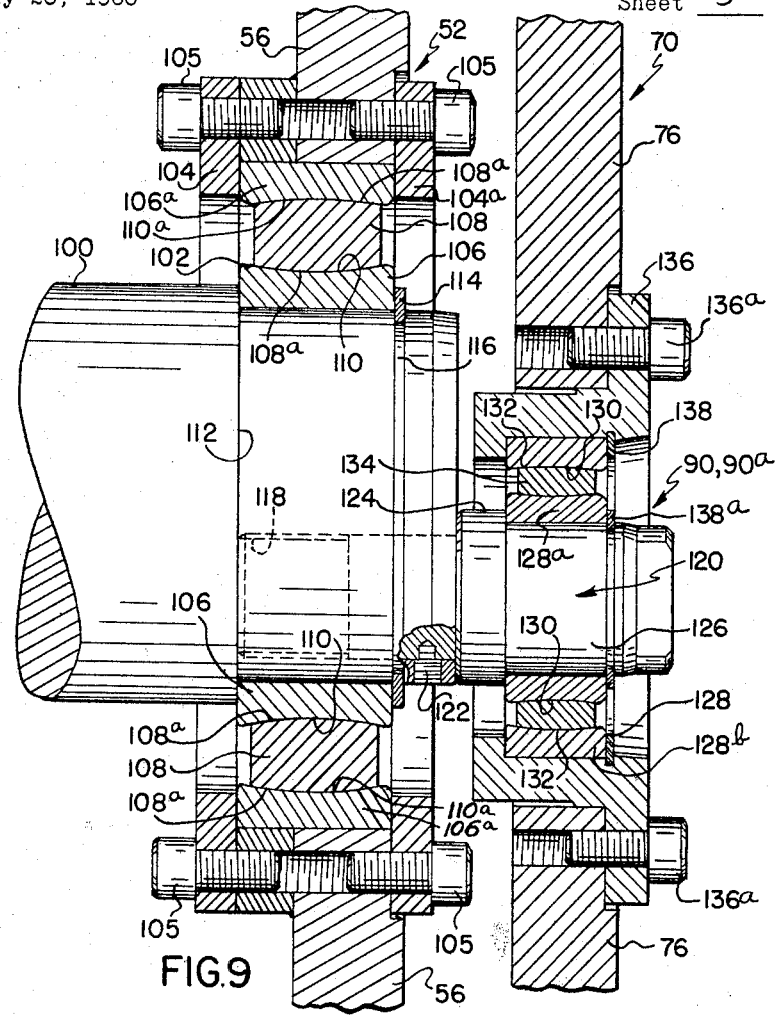
FIGURE 9 is an enlarged sectional, top plan view of one of the eccentrics which couple the extractor fork and associated carrier frame of FIGURES 5 to 7, to the extractor carriage.

As can be best seen in FIGURE 9, each of said eccentric couplings 90 or 90a may comprise a shaft 100 which preferably extends completely between the sidewalls 56 of the extractor carriage 52 and which is rotatably mounted at each end thereof in a bearing member 102. Bearing member 102 in turn is coupled to the associated sidewall 56 of the extractor carriage as by means of removable inner and outer bearing retainers 104, 104a and associated bolts 105. Bearing members 102 may each comprise inner and outer races 106, 106a and an intermediate bearing ring 108 having convex exterior surfaces 108a adapted for frictional coaction with confronting concave surfaces 110 and 110a on respectively the inner and outer races. In other words, the shaft 100 while being rotatable in the associated bearings 102, is not freely rotatable therein, and is prevented from free rotation by the frictional coaction between the bearing components, and between the bearing 102 and the shaft 100. Inner race 106 may be retained on the associated end of shaft 100 by shoulder 112 thereon, and split ring 114 coacting with a circumferential slot 116 in the shaft.

Each end of shaft 100 may be provided with a threaded recess 118 therein, mounting an eccentrically or radially disposed pin 120 which may be additionally secured to the shaft 100 as by means of a set screw member 122 preferably recessed into the shaft 100 substantially flush with respect thereto. Eccentric pin 120 has an enlarged diameter portion 124 adapted for abutting relation with the confronting end surface of shaft 100 and a reduced diameter portion 126 which is adapted to receive in generally frictional engaging relation a bearing 128 which mounts the associated hanger bracket 70 thereon. Bearing 128 may comprise inner and outer races 128a, 128b, each having a concave surface 130 disposed in frictional coaction with confronting convex surfaces 132 on an intermediate bearing ring 134, and in a generally similar manner as aforediscussed in connection with bearing 102. Retainer 136 and attaching bolts 136a may mount bearing 128 on the sidewall 76 of associated hanger bracket 70, and split retainer rings 138, 138a may coact with circumferential slots in respectively retainer 136 and pin 120, for retaining bearing 128 in assembled relation therewith.

In the unloaded condition of the extractor, or in other words the condition wherein a load is not supported on the extractor fork, the eccentric pin members 120 are disposed substantially in the positions illustrated in FIGURE 3 or in other words wherein the lengthwise axis of each pin 120 is oriented laterally with respect to the lengthwise axis of the associated main shaft member 100 and substantially in alignment with a horizontal plane passing through such axis. It will be seen therefore that in such unloaded condition of the extractor, the lengthwise axes of both shaft 100 and associated pin 120 are generally disposed in said horizontal plane. Upon application of downward force on the extractor fork, the shafts 100 and associated pin members 120 move relative to their bearings 102 and 128 respectively.

Mounted on the back side of the strut 60 attached to the front wall 56a of the extractor carriage may be a pair of spaced brackets 142 (FIGURES 3 and 4) each of which may include side flanges 142a and a connecting web 142b, the latter forming an apertured support. Coupled to each support 142b as by means of a threaded lug 150 and an associated threaded shank 152 may be a coupling member 154 having ear portions receiving therethrough a pin 154a coacting with the depending shank 152, for suspending such coupling member from support 142b. The coupling member 154 may in turn have a threaded aperture in the underside thereof which is adapted to receive in threaded relation an upstanding threaded lug on an associated electronic load cell 156.

Figure 10:
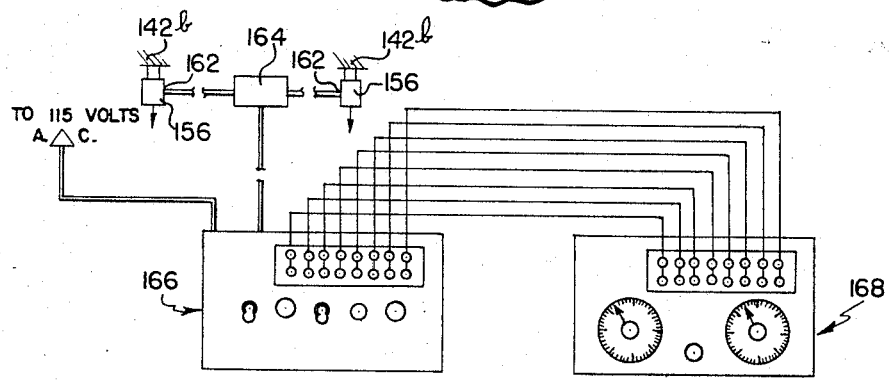
FIGURE 10 is a diagrammatic illustration of the weighing mechanism and its coupling to a visual read out mechanism for enabling the operator to readily determine the weight of the load on the extractor.

Such electronic load cells are of known construction, and operate to produce a current output or signal precisely proportional to the applied force or weight to the cell. Utilizing a differential transformer principle, high output is obtained with infinite resolution and freedom from drift or creep. A suitable load cell for use in the present arrangement has been found to be one identified as Model PB-40 manufactured by the Radson Engineering Corporation of Macon, Ill. Also a strain gage type load cell of conventional type manufactured for instance by the Streeter-Amet Corporation of Detroit, Mich. would be generally suitable. The underside of the load cell may include a threaded lug thereon which is adapted to be received in threaded relation in a holder member 158 which in turn may be coupled as by means of a pin 160 to the load or force applying arms 86 on the fork carrier 68. The load cells 156 may be coupled at their cable connector posts 162 to a conventional junction box 164 which in turn may be coupled in a known manner into a read-out system, which may include a control amplifier 166 (FIGURE 10) providing signal amplification to a visual read-out indicator 168, enabling an operator to directly read in weight units, such as pounds, the weight of a load supported on the load carrying extractor means of the load carrier. A suitable junction box 164 may be one identified as a PA-62 junction box manufactured by the aforementioned Radson Engineering Corporation and a suitable amplifier 166 has been found to be one identified as Model 450 also manufactured by said Radson Engineering Corporation. A suitable visual read-out mechanism has been found to be one identified as Model 480, also manufactured by said Radson Engineering Corporation, all of which units are available in commercial form. FIGURE 10 shows a schematic illustration of the coupling of the amplifier 166 and the visual read-out mechanism 168 to the load cells 156 and to a source of power. While a pair of load cells have been illustrated as providing the means for indicating the weight of a load on the extractor fork, it will be understood that only a single load cell could be utilized in generally central relation with respect to the extractor carriage 52 and in the event of such arrangement there would be provided only a single load applying arm extending rearwardly from the fork carrier 68.

Due to the eccentric mounting arrangement of the load carrying means 62 of the extractor to the extractor carriage 52, the force due to the load will be applied substantially vertically, in tension, to the load cell means 156, and therefore a very accurate determination of the weight of the load can be accomplished. As may be seen from FIGURE 3, the axes of all of the eccentric pins 120 of both sets of eccentric couplings 90, 90a in the embodiment illustrated, are generally disposed in a vertical plane passing through the vertical axes of the load cells and through the vertical axes of the coupling and holder members 152, 158 for the load cells, in the unloaded condition of the extractor fork 62.

Figure 4:
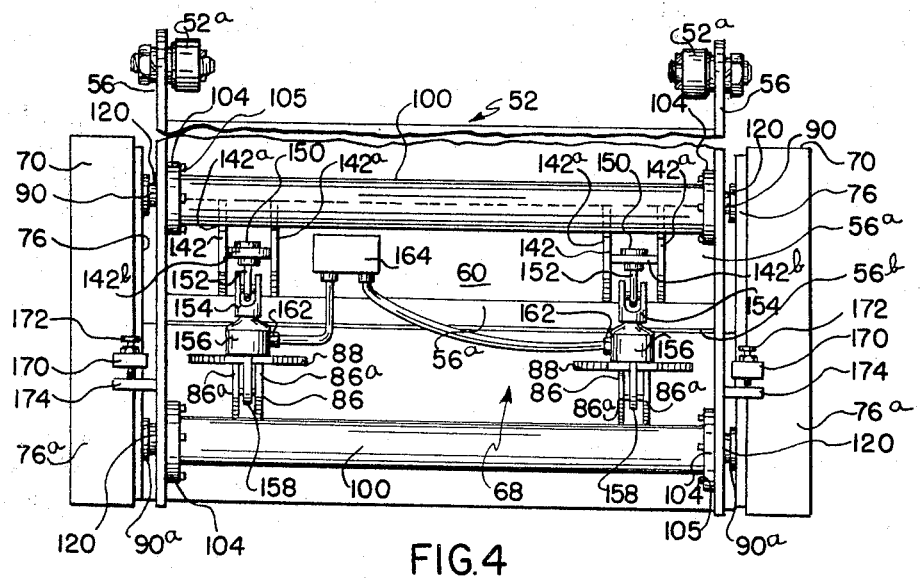
FIGURE 4 is a broken rear elevational view of the extractor and weighing mechanism illustrated in FIGURE 3.

It will be understood that substantially axial application of the load force to the load cells is highly desirable in order to obtain accuracy in the output of the load cell, since other than substantially vertically applied loads to the load cells distorts the outputs thereof, and thus will not give an accurate determination of the load being carried by the extractor. The actual rotational movement of the shafts 100 and associated eccentric pins 120 upon application of a load to the extractor is relatively small, and may be in the order of .007-inch maximum, and thus for all practical purposes, resulting in substantially vertical application of force to the load cells of the weighing system. As best seen in FIGURES 4 and 7, each hanger bracket 70 may be provided with a flange 170 extending rearwardly therefrom and mounting an adjustable member such as the threaded bolt 172. Bolt 172 is adapted for abutting engagement with an underlying lug 174 (FIGURE 4) secured to the associated sidewall 56 of the extractor carriage upon turning of the bolts to extend them downwardly, so as to provide a means for deactivating the weighing mechanism. Bolts 172 engaging lugs 174 also may provide a limit to the downward movement of the extractor fork and attached fork carrier with respect to the extractor carriage, when the extractor is supporting a load thereon, and therefore will limit the force able to be applied to the load cells. However this is not the main function of bolts 172 and underlying lugs 174, since as aforediscussed, the movement of the shafts and eccentric support pins is relatively small.

While in the embodiment illustrated, the load cells 156 are shown as loaded in tension, it will be understood that such cells can be loaded in compression also, to produce a current output proportional to the force applied thereto. In the latter event, the positions of the force applying arms 86 and the load cell supports 142b would be reversed from that illustrated.

The attachment of the fork 62 to the fork carrier 68 is preferably accomplished with adjustable bearing means, including hemispherical bearing seats, each adapted for coaction in movable relation with associated nut having a hemispherical undersurface formed complementary to the hemispherical seating surface of the seating member, and as disclosed in the aforementioned copending U.S. patent application Ser. No. 566,290. Thus it will be seen that with such arrangement, adjustment of the fork can be accomplished for instance by shimming the fork beam 64 with respect to the fork carrier 68, to ensure that the beam is level and in parallel relation with the aisle of the storage frame, while maintaining full surface-to-surface bearing relationship with respect to the fastener means 84 supporting the fork on the fork carrier, and as discussed in the aforesaid application Ser. No. 566,290.

From the foregoing discussion and accompanying drawings it will be seen that the invention provides a novel load handling and storage mechanism which includes a weighing mechanism for determination of the weight of the load carried by the load carrier for either depositing into or removal from an associated storage frame. The invention also provides a weighing mechanism arrangement which comprises an electronic load cell system including electronic load cells, for determining with very high accuracy the weight of a load supported by the load handling means of the load carrier.

The terms and expressions which have been used are used as terms of description and not of limitation, and there is no intention in the use of such terms and expressions of excluding any equivalents of any of the features shown or described, or portions thereof, and it is recognized that various modifications are possible.

I claim:

1. In a load transfer and storage mechanism comprising storage means adapted to receive loads therein, and a movable load carrier having an extractor including load supporting means, adapted to move along a travel zone disposed adjacent said storage means for depositing loads into and removing loads from said storage means, weighing mechanism operatively coupled to said extractor for determining the weight of a load on said extractor, said load supporting means being a cantilever-like arrangement mounted on said extractor, and spaced means movably mounting said load supporting means on said extractor whereby the weight of a load on the load supporting means will act substantially vertically on the weighing machanism, said spaced mounting means comprising eccentrics, each of which includes a main rotatable member and an eccentric member secured to said main member with the axis of said eccentric member being disposed radially of the axis of said main member and substantially within a horizontal plane passing through the axis of said main member, in the unloaded condition of said load supporting means, and said eccentric member mounting said load supporting means thereon.

2. A load transfer and storage mechanism in accordance with claim 1 including means on said extractor for selectively deactivating said weighing mechanism.

3. A load transfer and storage mechanism in accordance with claim 1 wherein said weighing mechanism includes an electronic load cell system comprising at least one load cell adapted to produce a current output proportional to the force applied to said cell by the weight of load supported on said load supporting means, and said axes of said eccentric members being disposed substantially within a vertical plane passing through the vertical axis of said load cell in the unloaded condition of said load supporting means.

4. In a load transfer and storage mechanism comprising storage means adapted to receive loads therein and a movable load carrier having an extractor including load supporting means adapted to move along a travel zone disposed adjacent said storage means for depositing loads into and removing loads from said storage means, weighing mechanism operatively coupled to said extractor for determining the weight of a load on said extractor, said extractor comprising a carriage, means for moving the extractor laterally of the travel zone and toward and away from said storage means, and carrier means attached to said load supporting means and to said carriage and movably supporting said load supporting means on said carriage, said carrier means including spaced bracket portions movably coupled to said carriage and a bridging portion extending between said bracket portions and secured to said load supporting means, and means secured to said carrier means and coacting with said weighing mechanism for applying to said weighing mechanism the force due to the weight of a load supported by said load supporting means, said weighing mechanism including an electronic load cell system comprising at least one load cell adapted to produce a current output proportional to the force applied to said cell by the weight of load supported on said load supporting means, means supporting said load cell on said carriage, said means secured to said carrier means being coupled to said load cell for applying the force due to the weight of load supported on said load supporting means to said load cell, and wherein said means supporting said load cell on said carriage is coupled to the upper end of said load cell and suspends said load cell on said carriage, and said means secured to said carrier means being coupled to the lower end of said load cell so that said load cell is loaded in tension upon application of a load to said load supporting means.

5. A load transfer and storage mechanism in accordance with claim 4 wherein said weighing mechanism includes a current amplifier, current transmitting means coupling said current amplifier to said load cell, and visual read-out means coupled to said current amplifier for translating the current from said current amplifier into weight units, whereby the weight of a load on said load supporting means can be visually read.

6. A load transfer and storage mechanism in accordance with claim 4 wherein said weighing mechanism includes a plurality of load cells, current transmitting means coupling said load cells to a current junction means, a current amplifier coupled to said junction means, and a visual read-out coupled to said amplifier for translating the current from said amplifier into weight units, whereby the weight of a load on said load supporting means can be visually read.

7. A load transfer and storage mechanism in accordance with claim 1 wherein said weighing mechanism includes a signal producing device adapted to develop a signal proportionate to the weight of load supported on said load supporting means, means for amplifying said signal, and means for changing said amplified signal into weight units for visual reading of the weight on the load supporting means.

8. A load transfer and storage mechanism in accordance with claim 1 wherein said weighing mechanism includes an electronic load cell system comprising at least one load cell adapted to produce a current output proportional to the force applied to said cell by the weight of load supported on said load supporting means.

9. The combination in accordance with claim 8 wherein said load supporting means comprises an elongated generally horizontally oriented beam with a plurality of spaced tines projecting generally horizontally outwardly from said beam for supporting a load thereon, and force applying means projecting from said beam in a direction generally opposite to the direction of projection of said tines for applying the force due to the weight of a load on such load supporting means to said load cell.

10. In combination a mobile load carrier for handling a load and a weighing mechanism, said load carrier comprising movable load supporting means, said weighing mechanism being operatively coupled to said load supporting means for determining the weight of a load on said load supporting means, said load supporting means being a cantilever-like arrangement, means coacting with said load supporting means for applying the force due to the weight of a load on said load supporting means substantially vertically to said weighing mechanism, said weighing mechanism including an electronic load cell system comprising at least one load cell adapted to produce a current output proportional to the force applied to said cell by the weight of load supported on said load supporting means, and wherein said load carrier includes a movable carriage, said carriage mounting said load supporting means thereon, said means coacting with said load supporting means comprising spaced eccentrics, each of which includes a main rotatable member mounted on said carriage and an eccentric member secured to said main member with the axis of said eccentric member disposed radially of the axis of said main member and substantially within a horizontal plane passing through the axis of said main member in the unloaded condition of said load supporting means, and said eccentric member mounting said load supporting means thereon.

11. The combination in accordance with claim 10 including bearing means coacting between said main member and said carriage for resisting free rotatable movement of said main member.

12. In a load transfer and storage mechanism comprising storage means adapted to receive loads therein and a movable load carrier having an extractor including load supporting means, adapted to move along a travel zone disposed adjacent said storage means for depositing loads into and removing loads from said storage means, weighing mechanism operatively coupled to said extractor for determining the weight of a load on said extractor, said load supporting means being a cantilever-like arrangement mounted on said extractor, and means movably mounting said load supporting means on said extractor whereby the weight of a load on the load supporting means will act substantially vertically on the weighing mechanism, said mounting means comprising an eccentric including a main rotatable portion and an eccentric portion secured to said main portion with the axis of said eccentric portion being disposed radially of the axis of said main portion and substantially within a horizontal plane passing through the axis of said main portion in the unloaded condition of said load supporting means, and said eccentric portion mounting said load supporting means thereon.

References Cited

UNITED STATES PATENTS

| | | | |
|---|---|---|---|
| 2,765,928 | 9/1956 | Riemenschneider | 212—135 |
| 3,244,243 | 5/1966 | Fielder | 177—211 |
| 3,270,893 | 9/1966 | Dechantsreiter | 212—2 |

ROBERT S. WARD, JR., *Primary Examiner.*

L. H. HAMBLEN, *Assistant Examiner.*

U.S. Cl. X.R.

177—211, 245; 212—2, 135